April 14, 1970   R. K. HOFFMAN ET AL   3,506,589
AEROSOL GENERATOR

Filed Dec. 22, 1967   2 Sheets-Sheet 1

INVENTORS
ROBERT K. HOFFMAN
ARTHUR R. DOLEGOWSKI
BY Sheridan and Ross
ATTORNEYS

April 14, 1970     R. K. HOFFMAN ET AL     3,506,589
AEROSOL GENERATOR
Filed Dec. 22, 1967     2 Sheets-Sheet 2
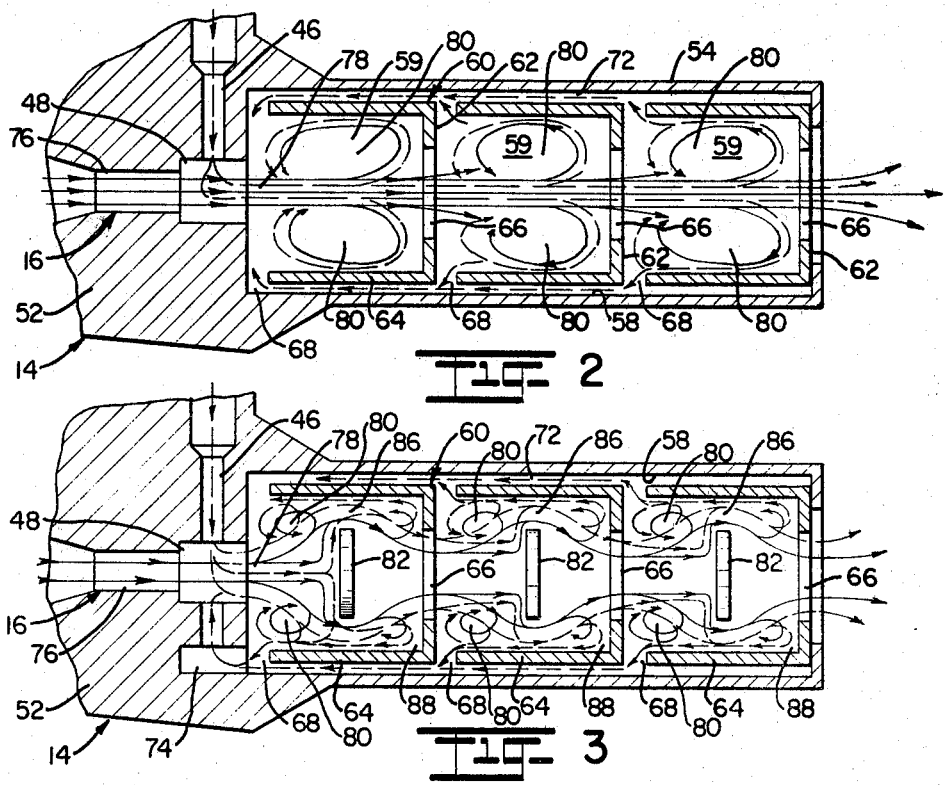
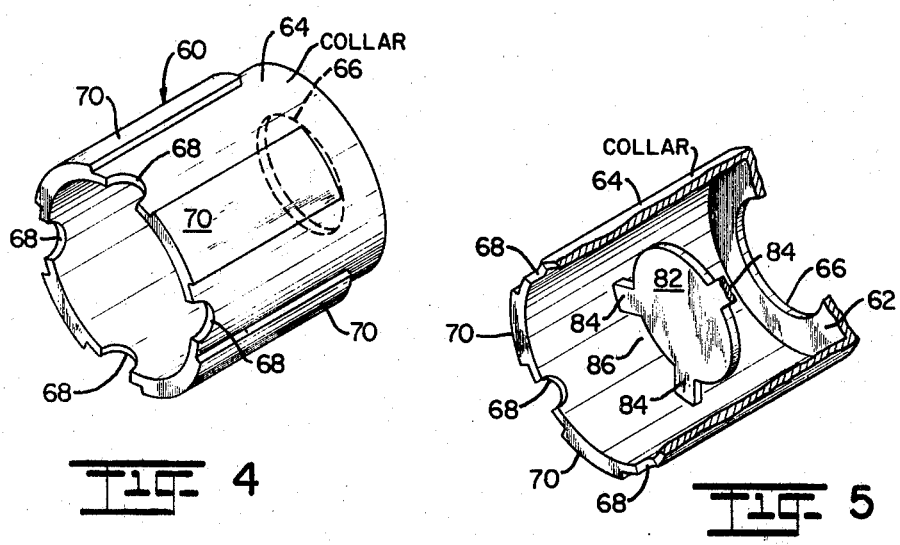
INVENTORS
ROBERT K. HOFFMAN
ARTHUR R. DOLEGOWSKI
BY
*Sheridan and Ross*
ATTORNEYS

United States Patent Office 3,506,589
Patented Apr. 14, 1970

3,506,589
AEROSOL GENERATOR
Robert K. Hoffman, Littleton, and Arthur R. Dolegowski, Denver, Colo., assignors to C. A. Norgren Co., Littleton, Colo., a corporation of Colorado
Filed Dec. 22, 1967, Ser. No. 692,942
Int. Cl. B01f 5/00
U.S. Cl. 252—359                      17 Claims

ABSTRACT OF THE DISCLOSURE

An aerosol generator has an elongate mixer section with a longitudinal passage. An induction zone in the upstream end is connected to liquid supply to aspirate liquid. Barriers in classifying zone at the downstream end form a series of classifying cells to reject larger liquid droplets. Central apertures in the barriers provide a flow path for a mixture stream. A flow path from the cells back upstream to the inlet end of classifying zone is provided whereby the mixture aspirates rejected liquid to increase fog concentration in the mixture stream. A mixer body surrounds the mixer section to form an annular flow path for additional gas, and is controlled by an annular valve. An adjacent outlet insures intimate mixing of annular and central flows.

BACKGROUND OF THE INVENTION

Figure 1:
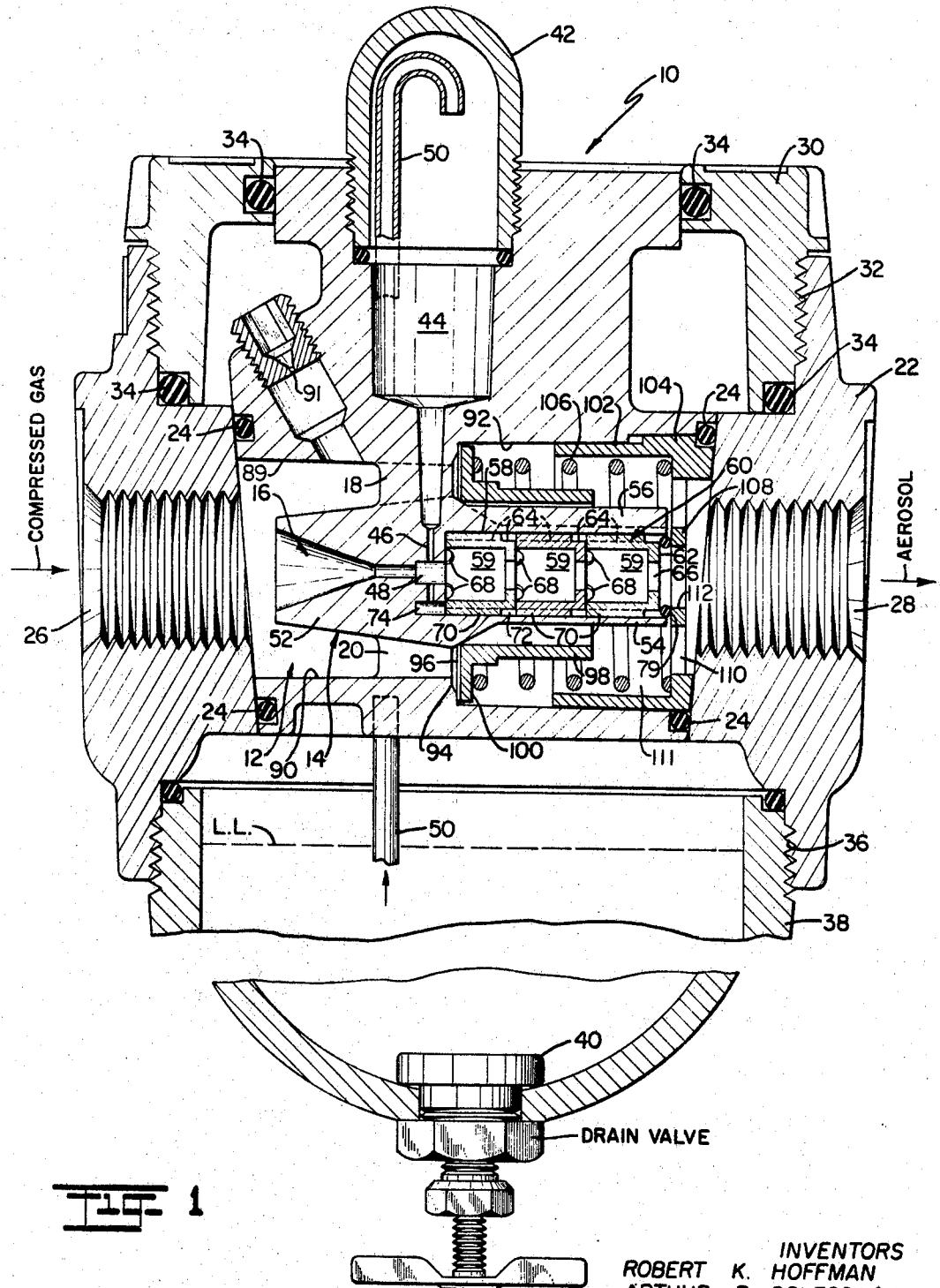

This invention lies in the field of devices for mixing a small percentage of liquid in a flow of pressurized gas to form a mist or fog, commonly referred to as an aerosol. Such devices are used in industry primarily for mixing lubricant with compressed air to provide adequate lubrication for tools such as compressed air motors, but they can be used quite successfully for other purposes, such as atomizing insecticides. The invention is primarily directed to an aerosol generator which produces a miximum proportion of extremely small liquid particles with a minimum amount of simple equipment.

There are many aerosol generators now on the market which are suitable for combining lubricant with compressed air to be used in air tools. Among the most widely used are two types produced by the C. A. Norgren Co. of Littleton, Colorado, known as the "Oil-Fog" lubricator, Model 10–003, and the "Micro-Fog" lubricator, Model 10–006. The former is a very simple device with an aspirator located in the through line carrying compressed air and supplied with oil by a drip feed system. The latter is more complicated and is provided with a venturi and diffuser. A generator of this type is illustrated and described in the U.S. patent to Friedell, No. 2,890,765, issued June 16, 1959.

The "Oil Fog" lubricator produces a mist in the compressed air which includes a quantity of very small particles and also a rather substantial quantity of large particles or droplets which tend to deposit out as the mixture flows through the line to the work station. This is quite satisfactory when the tool is only a short distance from the lubricator and is not adversely affected by oil flooding. However, when the line to the tool is rather long, so much oil may deposit out that lubrication will be insufficient. Moreover, it sometimes happens that a slug of oil will be carried to the tool and interfere with its proper action.

The "Micro-Fog" lubricator overcomes these difficulties because its construction and operation rejet almost all of the larger droplets and return them to the supply bowl. At the same time it injects into the air extremely fine particles for proper operation of a tool. However, the amount of actual oil delivered in the form of fine particles in certain applications of the lubricator may not be sufficient. Thus there is a need for a lubricator which is capable of delivering large quantities of actual oil with a very substantial portion of the quantities delivered being in the form of very fine particles. Also there is need such a lubricator tht automatically permits accommodation to a wide range of air flows.

SUMMARY OF THE INVENTION

The present invention provides a device which meets this need. Generally stated, it comprises a mixer section in the form of an elongate body having a longitudinal flow passage therethrough. The first, upstream end of the mixer section is adapted to communicate with a supply conduit containing compressed gas, and the second, downstream end is adapted to communicate with an exhaust conduit for carrying the gas to a work station. An induction zone is formed at an intermediate point in the flow passage and is fed with liquid by a conduit connected to a supply source.

The flow passage is enlarged downstream of the induction zone to form a classifying zone, and a plurality of transverse barriers are mounted in the classifying zone in longitudinally spaced relation to form a plurality of classifying cells. Each barrier is formed with a central aperture to provide a flow path from one cell to the next, the last aperture providing for flow to the outlet port of the mixer section and thence to the exhaust conduit.

When the mixture stream exits from the induction zone, it expands in the first classifying cell and a toroidal flow is produced around the center of the stream. The centrifugal action in the toroid throws the larger droplets against the cell walls and they coalesce and flow together. A similar action occurs as the stream enters each succeeding cell so that the liquid remaining in the stream is almost entirely made up of particles of microscopic size.

A flow path is provided from the cells back to the upstream end of the classifying zone where the liquid is again aspirated by the stream and broken up into particles of various size. The smaller particles add to the total in the main stream and the larger particles are again rejected or deposited out for further processing.

In the preferred form, the cells are defined by a series of cell cups each having a cylindrical side wall and an apertured end wall, and the cups are arranged with the end walls downstream. Portions of the free edges of the side walls are cut away to provide a radial flow path from the interior of each cup to the exterior. Longitudinal ribs are provided on the exterior of each cup to space it radially from the wall of the classifying zone, and this space provides the upstream flow path for the returning liquid.

In some cases the return flow path is extended to communicate with the induction zone so that it will be subject to the maximum aspiration effect. Since the rejected liquid recirculates in the classifying zone until it is carried away in finely divided form by the mixture stream, no liquid from the classifying zone is returned to the source of supply and consequently a much greater total amount of liquid is delivered to the work station with a given rate of supply to the induction zone than with the "Micro-Fog" type lubricator. Although some larger droplets are carried along, the great majority of the mist is in the form of very fine oil particles as distinguished from that produced by the "Oil-Fog" lubricator. Another advantage of the present construction is that whenever flow is stopped, some liquid remains in the classifying zone. Therefore, when flow is resumed, the stream instantly picks up some fluid even before the supply from the main source reaches the induction zone.

In some cases a second set of baffles or barriers is provided, one in each cell cup, and arranged to force the total flow from the center to the side walls and back in each cell, thus producing a reverse bend flow to increase the rejection of the larger droplets.

A bypass passage is provided to permit, on demand, for a larger flow of gas than can be accommodated in the flow passage through the mixer section. This bypass passage surrounds the mixer section and is controlled by an annular valve. Its outlet is adjacent to the outlet from the mixer section so that the two flows immediately merge, and diffusion of the liquid throughout the total stream is assured.

BRIEF DESCRIPTION OF THE DRAWINGS

Various other advantages and features of novelty will become apparent as the description proceeds in conjunction with the accompanying drawings, in which:

FIG. 1 is a central longitudinal sectional view through a complete device incorporating the invention;

FIG. 2 is an exaggerated schematic illustratory view of the subject invention through a slightly modified induction zone and a classifying zone depicting the nature of the flow therein;

FIG. 3 is a view similar to FIG. 2, illustrating a further slight modification;

FIG. 4 is an isometric illustratory view of one of the cell cups; and

FIG. 5 is a similar view of a modified form of cell cup.

DESCRIPTION OF THE PREFERRED EMBODIMENTS

A complete aerosol generator ready to be connected into a compressed gas flow line is illustrated in FIG. 1, in which a mixer body 10 is provided with a stepped bore 12. Centrally located in the bore is a mixer section 14 provided with a longitudinal flow passage 16 for a stream of compressed gas. Radial ribs 18 support the mixer section so that it defines with the mixer body a generally annular bypass passage 20 surrounding the mixer section.

A supporting base member 22 surrounds the lower part of the mixer body and is sealed thereto by O-rings 24. The base member is provided with a first, upstream fitting 26 for connection with a supply conduit carrying compressed gas, and with a second, downstream fitting 28 for connection with an exhaust conduit for carrying the mixture stream to a work station. The upper portion of member 22 is closed by a cap 30 having a threaded connection 32, and the cap is sealed to members 10 and 22 by O-rings 34.

The open bottom of member 22 is provided with a threaded bore 36 to receive the supply bowl 38 which carries the basic supply of liquid, usually lubricating oil, which is to be ingested into the stream of compressed gas. The bowl is provided with a drain valve 40. A drip feed dome 42 is sealingly mounted in the top of mixer body 10 and communicates by way of bore 44 and conduit 46 with the induction zone 48 formed in an intermediate portion of flow passage 16. As will be seen and as is conventional, the bowl 38 is pressurized with inlet pressure through bleed orifice 91 and thus due to the pressure differential or drop across body 10 operation of the device results in a lift effect and a partial vacuum in dome 42 and therefore in drip tube 50. The latter conveys liquid from the supply in bowl 38 and it drips into bore 44, passing through conduit 46 into the induction zone. This portion of the operation is generally conventional and is explained in more detail in the patents to Friedell, No. 2,890,765, previously referred to, C. A. Norgren et al. No. 2,718,934 and our pending U.S. application Ser. No. 462,356 filed June 8, 1965, now Patent 3,368,645.

The induction zone 48 is formed in the enlarged first or upstream end 52 of mixer section 14, and the upstream end of flow passage 16 is adapted to communicate with a supply conduit by way of inlet fitting 26. Passage 16 tapers to a relatively small diameter as it reaches the induction zone in order to form a small, high velocity stream of gas which aspirates and atomizes the liquid entering the induction zone through conduit 46.

The downstream portion of the mixer section is preferably formed as a cylindrical chamber or classifying zone 54 which is smaller in diameter than the upstream end 52. A plurality of radially and longitudinally extending guide ribs 56 are provided on the external wall for purposes to be outlined later. The interior wall 58 is preferably though not necessarily cylindrical and its axis is in longitudinal alignment with the axis of the induction zone 48. The classifying zone is divided into at least one and preferably a plurality of classifying cells 59 defined by cell cups 60 located in the chamber as shown in FIG. 1. Each cell cup comprises an end wall or barrier 62 and a side wall or collar 64 secured thereto. Thus, the classifying cells are defined by a plurality of transverse barriers 62 spaced longitudinally in the chamber by collars 64.

Each end wall or barrier 62 has a central aperture 66, and it will be seen that in the arrangement of FIG. 1 the aligned apertures provide a straight through flow path for the mixture stream issuing from induction zone 48. As will be discussed in detail later, the stream expands into the first classifying cell and rejects or deposits out many of the larger liquid droplets. The stream then passes through the first barrier aperture 66 and more larger droplets are rejected. The number of successive cells depends on the nature of the liquid being atomized and the degree of mist refinement desired. The optimum arrangement for the majority of installations at the present time has been found to be about three.

In order to obtain the desired results the liquid which is rejected must flow out of the cells and back upstream to the vicinity of the induction zone or its outlet. For this purpose the free edge of each collar or side wall 64 is cut away at one or more places to form radial flow paths 68 from the interior to the exterior of each cell cup. The detailed construction of the cup is best seen in the greatly enlarged illustration of FIG. 4. In this figure it will also be seen that each cup is provided with a plurality of radially and longitudinally extending ribs 70 on its outer surface. Returning to FIG. 1, it will be seen that these ribs space the cell cups radially from wall 58 to provide an upstream flow path 72 from each radial port 68 to the upstream end of the classifying zone adjacent to the outlet from the induction zone. In some cases it is found desirable to provide an extension of the upstream flow path in the form of passage 74 which leads directly to induction zone 48, thus subjecting the rejected liquid to the maximum aspiration force of the gas stream and also to all of the refining effect of the classifying zone.

The manner in which the invention functions to produce the desired result is diagrammatically and schematically illustrated in FIG. 2. The device broadly comprises a mixer portion which is the upstream end 52 of the mixer section and contains induction zone 48 and a classifier or classifying zone 54. As previously noted, upstream end 52 and the flow passage 16 are adapted to communicate with a supply conduit carrying pressurized gas which enters passage 16 as a stream 76. When the stream enters induction zone 48 it aspirates the liquid which drips down through conduit 46 and is indicated by the dotted line. The resulting mixture contains many fluid particles of the desired extremely fine size and also many larger droplets which would tend to deposit out in a long exhaust line or flood the tool when a short line is used. The mixture stream of aerosol 78 now leaves the induction zone and enters the classifier, and the outlet of the induction zone is in effect the inlet port of the classifier.

Because of the much larger cross sectional area of each cell 59, stream 78 expands radially in all directions as it enters and the outer portions of the stream form a toroidal figure 80 surrounding the axis of stream 78, The centrifugal force generated in the toroid rejects or deposits out most of the larger liquid droplets against the inner surfaces of barrier 62 and collar 64. These droplets coalesce and flow along the bottom of the cell to the vicinity of inlet port 48. At this point the liquid is again aspirated and some of it becomes extremely finely divided while some of it again remains in the form of larger droplets to be rejected in the further processing.

Stream 78 passes through aperture 66 into the second cell where the same rejecting action takes place. The rejected liquid in this cell flows out through radial ports 68 into the upstream return flow path 72 and gradually flows to the upstream end of the classifier where it joins the liquid rejected in the first cell. It should be apparent that the static pressure in the first cell following zone 48 is lower than that of the second cell with the pressure in the third being less than in the third cell (aerosol velocities are reverse); therefore the coalesced liquid is caused to travel and return to that end of the classifying zone adjacent the induction zone. The same action takes place in the third and any succeeding cell which may be used in the device. When stream 78 passes through the last aperture 66 it expands out radially into the fitting 28 of FIG. 1. At this point the major part of the larger droplets have been rejected and the resulting liquid has been reprocessed many times until most of it is carried by stream 78 in the form of suitably small particles. Thus, the novel classifier accomplishes several needs and important functions as previously outlined such as liquid being instantaneously available due to some remaining in the classifying zone when air flow is stopped. The mist which is finally carried to the work station, due to recirculation and reprocessing, is almost as greatly refined as that produced by the "Micro-Fog" device previously discussed. Also, and this is of extreme importance as is the latter function, since none of the liquid from the classifier is returned to the supply bowl and since there is continual reprocessing, the total delivery of liquid is much greater than that of the previous device. By noting FIG. 4, the dotted lines of the classifier of FIG. 1 exemplifying the flow space between ridges 70 and bearing in mind that the width of slot or passage 74 is considerably greater than the width of a rib 70, the reprocessing flow pattern will be clearly understood. It should be mentioned that to preclude leakage a seal 79 in the form of an O-ring is provided. Further during reprocessing liquid first accumulates and builds up the first cell, then the second etc.

The modified device of FIG. 3 is provided with the cell cups shown in FIG. 5. It will be seen that these cups 60 are identical to those of FIG. 4 but, in addition, they are provided with a second barrier in the form of a disk-like member 82 which is located intermediate the ends of collar 64. Barrier 82 is smaller in diameter than the inner wall of collar 64 and is held in a central location by ribs 84 so that an annular passage 86 is formed between the periphery of the barrier and the wall of the collar.

When the cell cups of FIG. 5 are installed in the classifier, the flow pattern of the aerosol is generally as shown in FIG. 3. As stream 78 enters each cell, it expands in the same way as in FIG. 2 and produces toroids 80 which reject the larger droplets. In addition, the entire stream is forced to divide and flow through the annular passage 86. The return to the axis of the classifier produces a reverse bend flow, and additional larger droplets are rejected by centrifugal force and are deposited in corners 88. These added rejection actions further refine the mist content of stream 78. The device of FIG. 3 further includes the passage 74 which serves as an extension of passage 72 to return a large part of the rejected fluid to the induction zone 48 where it will be subjected to maximum aspiration forces.

In some of the installations the total gas flow requirement at the work station is fairly constant or at least has a maximum value which does not exceed the flow capacity of the aerosol generator. In such cases, the device may be of minimum size. However, many aerosol generators are provided with bypasses to provide for greatly increased airflow on occasion and they are therefore much more universal in application and utility.

A novel bypass construction is shown in FIG. 1, where it will be seen that mixer section 14 is considerably smaller than the bore 12 of the mixer body 10 and is centrally located to provide a bypass passage 20 surrounding the mixer section. Radial ribs 18 maintain the spacing. Bore 12 is divided into smaller bore 90 and larger bore 92 connected by a shoulder which functions as an annular valve seat 94. The largest diameter of the mixer section is in transverse alignment with seat 94 and is formed to function as a cooperating annular valve seat 96, with passage 20 extending between the two seats.

A closure valve member is provided and comprises a sleeve portion 98 longitudinally slidable on guide ribs 56 and provided with an outward flange 100 to serve as a valve head and contact seats 94 and 96 to block flow through bypass passage 20. A retainer is provided which comprises a sleeve 102 fitting in bore 92 and a flange 104 which provides a stop for one end of compression spring 106, the other end of which contacts valve head 100 to retain it in closed position. On the occasion of high flow demand, the pressure on the upstream side of the valve head forces it downstream to open the bypass passage 20. It is to be understood that as taught in said application Ser. No. 462,356, now Patent 3,368,645 the by-pass may be constructed to be bidirectional.

The retainer further includes a central backup portion 108 which engages the last cell cup and maintains the cup assembly in position in the classifier chamber. The backup portion is connected to flange 104 by ribs 110 and is provided with a central aperture 112 to allow exit of the aerosol stream from the classifier. It will be seen that when the valve 100 is open, the additional gas will flow through the openings in the retainer between ribs 110 and enter fitting 28 practically in cylindrical form surrounding the aerosol stream. The latter expands radially as it leaves outlet port 66 and the two streams intermingle violently and assures a very intimate mixture so that there will be a very consistent liquid mist concentration in the combined stream. It must be understood that the air and oil diagrammatic depiction shown in FIGURES 2 and 3 is only illustrative and based on belief, as a result of thorough testing, and obviously the complete depiction of the stream is not shown. There would be variations of even some of the flow patterns illustrated such as the toroid 80 at the bottom of cell 1 in FIGURE 3 would apply only to some air and very light oil particles and for that matter most of the oil would not follow this pattern but would travel downwardly into area 74. In any event, the flow is turbulent and not laminar and in this connection there would be many more turbulent flow patterns than illustrated, for example, in FIGURE 2.

Still further modifications in the generator of the subject invention and the lubricator structure associated therewith may be made to accommodate to certain desired conditions of operation. For example, in some applications excessive oil might be damaging and also there could be excessive oil accumulation in a few instances of operation in the classifier that would in effect "slop over" into the line connected to fitting 28. To meet any such conditions, said line or piping could be slightly sloped to cause liquid to drain towards fitting 28 and one or more holes could be provided in body 10 and associated parts so that there would be liquid communication from 28 through the area 111 to the bowl reservoir 38 whereupon such excessive oil would drain back into the bowl. Of course with such a modification bleed orifice 91 would not be used and the lift effect to tube 50 would be created by bowl pressure being at outlet pressure. Assuming with such an arrangement there were three cells 64 and bearing in mind previous remarks relative to cell pressures and that outlet pressure tends to recover further away from zone 48, it might be necessary in order to have sufficient lift to short circuit, in effect, the third cell by providing communication between the interior thereof and area 111 by means of one or more holes in body 64 of the third cell, namely the one furthest removed from zone 48. Also with such an arrangement, port or slot 74 would be eliminated for the same reasons, as depicted in FIGURE 2, and the oil that accumulated would be reprocessed by being picked up or aspirated by the main stream. All of these types of modification possibilities are of the type known to those skilled in the art.

It will be apparent to those skilled in the art that various changes may be made in the construction as disclosed without departing from the spirit of the invention, and it is intended that all such changes shall be embraced within the scope of the following claims. For example, in the claims, reprocessing "through said induction zone" is intended to include reprocessing through 74 and as shown in FIGURE 2.

We claim:

1. An aerosol generator comprising: an elongate, primary mixer section having a longitudinal flow passage therethrough, with a first upstream inlet end adapted to communicate with a supply conduit containing gas pressurized above ambient pressure, and a second downstream outlet end adapted to communicate with an exhaust conduit for carrying the gas to a work station; a liquid supply source connected to said section; an induction zone formed in said flow passage intermediate the ends thereof; a liquid supply conduit connected at one end to the liquid suply source and at the other end to said induction zone to supply liquid thereto for mixture with the gas flowing therethrough; and a classifying zone formed in said flow passage downstream of the induction zone; the classifying zone being elongate and considerably larger in cross sectional area than the induction zone; a plurality of barriers extending tranversely of the classifying zone to form a plurality of classifying cells; each barrier being formed with a central aperture to form a through flow path for the gas-liquid mixture; each enlarged classifying cell being adapted to induce radially outward expansion of the flowing mixture and produce a toroidal flow to deposit the larger liquid droplets out of the mixture; and means forming a flow path for said droplets to gather and flow upstream to a position for repeated induction into the mixture stream flowing through the classifying zone and without return of same to said liquid supply source.

2. An aerosol generator as claimed in claim 1; wherein said means forming a flow path provides an extension of said upstream flow path in the classifying zone to connect it to said induction zone to provide a continuous return path for classified droplets.

3. An aerosol generator as claimed in claim 1; and a second set of barrers in said classifying zone; one barrier being located in each cell and extending tranversely thereof intermediate its ends; each barrier being imperforate in its central portion and terminating short of the walls of the cell to define a reverse bend flow path through each cell to increase the rejection of the larger liquid droplets.

4. An aerosol generator as claimed in claim 1; and a hollow mixer body surrounding said mixer section in spaced relation to define between them a bypass passage surrounding the mixer section and adapted to communicate with the supply and exhaust conduits; and a valve in said bypass passage; said valve being normally closed to direct all gas flow through the mixer section, and being adapted to open for high flow rates and permit additional gas to flow around the mixer section.

5. An aerosol generator as claimed in claim 4; the outlet of said bypass passage being adjacent to the outlet of said mixer section to facilitate intimate mixing of the additional gas with the mixture stream.

6. An aerosol generator as claimed in claim 4; said mixer section having an enlarged upstream portion and a reduced downstream portion surrounding the classifying zone; the upstream portion being provided with an annular valve seat; the downstream portion being cylindrical and provided with upstanding longitudinally extending guide ribs; the inner wall of said mixer body being generally cylindrical and provided with an annular valve seat in transverse alignment with the valve seat on the mixer section; said seats defining an annular air passage between them; and a valve member having a sleeve portion slidable on said guide ribs and a flange extending laterally to define a valve head for engagement with said valve seats to block the flow of gas between the mixer section and the mixer body; said valve member being movable in a downstream direction to allow flow between said valve seats and between said sleeve member and the downstream portion of said mixer section.

7. An aerosol generator as claimed in claim 6; and a compression spring biasing said valve member upstream to a closing position; said valve member being movable to open position in response to increase in pressure on the upstream face of said valve head.

8. A classifier for refining a flowing stream of a gas-liquid mixture in the form of an aerosol, comprising: an elongate hollow chamber having an inlet port to receive a stream of pressurized aerosol and an outlet port to discharge the stream; the cross sectional area of the chamber being considerably larger than that of the inlet port; a plurality of barriers extending transversely of the chamber to form a plurality of classifying cells; each barrier having a diameter less than that of the chamber and being formed with a central aperture to form a through flow path for the aerosol; each classifying cell being adapted to induce radially outward expansion of the aerosol stream and produce a toroidal flow therewithin to deposit the larger liquid droplets out of the aerosol upon the cell wall; and means forming a flow path for said droplets out of each cell to gather with the droplets of the other cells and flow upstream to a position adjacent the inlet port and for reentry into the stream of pressurized aerosol.

9. A classifier as claimed in claim 8; the apertures in said barriers being in axial alignment with said inlet port and being of larger cross sectional area than said inlet port to provide an enlarged straight through flow path for the aerosol stream.

10. A classifier as claimed in claim 8; and a transverse barrier in each classifying cell intermediate its ends; each barrier being imperforate in its central portion and terminating short of the walls of the cell to define a reverse bend flow path through each cell to increase the rejection of the larger liquid droplets.

11. A classifier as claimed in claim 8; each classifying cell being further defined by a collar serving to space the first barrier from the inlet port and each succeeding barrier from the preceding barrier.

12. A classifier as claimed in claim 11; the collar and barrier defining each cell being united to form a cell cup; each cup being arranged in the classifying zone with the barrier portion downstream of the collar portion.

13. A classifier as claimed in claim 11; said collars and barriers being spaced from the chamber wall to form the flow path for upstream flow of the separated classified droplets.

14. A classifier as claimed in claim 12; wherein the means forming a flow path comprises each collar having a portion cut away to provide communication between the interior of said collar and the flow path formed between said collar and the surrounding wall.

15. An aerosol generator having a flow passage with an upstream end for receiving gas pressurized above ambient pressure and a downstream end for connection with a work station, an induction zone formed in the flow passage with liquid supply means connected thereto to supply liquid to the gas thus creating an aerosol for delivery to the downstream end classifying means formed in the flow passage for coalescing larger liquid particles in the aerosol received from the induction zone prior to said particles reaching said downstream end and means within the flow passage for reprocessing the coalesced liquid droplets directly into said induction zone and without return of same to said liquid supply means.

16. A generator as defined in claim 15; wherein the classifying means comprises at least one cell like member having barrier means forming the coalescing means and an opening for flow of aerosol towards the downstream end.

17. A generator as defined in claim 16; wherein there are a plurality of aligned cells with eac hhaving means communicating with the induction zone for return of coalesced liquid droplets thereto.

References Cited

UNITED STATES PATENTS

| | | | |
|---|---|---|---|
| 3,302,374 | 2/1967 | Szekely | 55—226 |
| 690,486 | 1/1902 | Tomlinson | 60—37 |
| 1,917,643 | 7/1933 | Goldkamp | 75—41 |
| 2,364,199 | 12/1944 | Derr | 252—359.1 |
| 1,557,838 | 10/1925 | Hiller | 165—118 |
| 3,370,635 | 2/1968 | Kumm | 159—13 |

FOREIGN PATENTS 1,106,417  12/1955  France.

NORMAN YUDKOFF, Primary Examiner

J. SOFER, Assistant Examiner

U.S. Cl. X.R.

239—338; 259—4; 261—78